United States Patent
Cohen et al.

(10) Patent No.: US 7,082,476 B1
(45) Date of Patent: Jul. 25, 2006

(54) SYSTEM AND METHOD OF OPTIMIZING RETRIEVAL OF NETWORK RESOURCES BY IDENTIFYING AND SUBSTITUTING EMBEDDED SYMBOLIC HOST NAME REFERENCES WITH NETWORK ADDRESSES IN ACCORDANCE WITH SUBSTITUTION POLICIES

(75) Inventors: Ron Cohen, Rehovot (IL); Yoram Snir, Hananya (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/578,027

(22) Filed: May 24, 2000

Related U.S. Application Data

(60) Provisional application No. 60/150,394, filed on Aug. 23, 1999.

(51) Int. Cl.
G06F 15/16 (2006.01)
G06F 15/173 (2006.01)

(52) U.S. Cl. ............ 709/246; 709/219; 709/226; 709/229

(58) Field of Classification Search ............ 709/217, 709/203, 201, 219, 228; 707/10; 717/161; 379/88.13; 715/501.1; 345/758; 705/14
See application file for complete search history.

(56) References Cited

U.S. PATENT DOCUMENTS

| | | | | |
|---|---|---|---|---|
| 5,752,022 | A * | 5/1998 | Chiu et al. | 707/10 |
| 5,867,711 | A * | 2/1999 | Subramanian et al. | 717/161 |
| 5,920,859 | A * | 7/1999 | Li | 707/5 |
| 6,026,240 | A * | 2/2000 | Subramanian | 717/161 |
| 6,052,718 | A * | 4/2000 | Gifford | 709/219 |
| 6,226,642 | B1 * | 5/2001 | Beranek et al. | 707/10 |
| 6,272,523 | B1 * | 8/2001 | Factor | 709/201 |
| 6,286,029 | B1 * | 9/2001 | Delph | 709/203 |
| 6,334,145 | B1 * | 12/2001 | Adams et al. | 709/217 |
| 6,339,761 | B1 * | 1/2002 | Cottingham | 705/14 |

(Continued)

OTHER PUBLICATIONS

Berners-Lee, et al,; RFC 1945: Hypertext Transfer Protocol—HTTP/1.0; May 1996.*

*Primary Examiner*—Rupal Dharia
*Assistant Examiner*—Quang N. Nguyen
(74) *Attorney, Agent, or Firm*—Hickman Palmero Truong & Becker LLP

(57) ABSTRACT

A method and apparatus are provided for optimizing retrieval of network resources. In one embodiment, a method of optimizing access to a network resource is implemented in a computer program executed by a router, cache server, or proxy server. A network resource that contains one or more embedded symbolic host name references is received. A network address corresponding to each of the embedded symbolic host name references is determined. A modified copy of the network resource is created and stored; in the modified copy, a network address is substituted for each corresponding embedded symbolic host name reference. Thereafter, the modified copy of the network resource in responding to all subsequent client requests for the network resource, thereby greatly reducing the required number of network address lookup operations. In one specific embodiment, IP addresses are determined using DNS queries for the hostname portion of all URLs that are embedded in a Web page using image, applet, object, or embed tags. The IP addresses are stored in place of the hostname portions in a modified copy of the Web page, typically in a cache. As a result, when the modified page is subsequently served to clients, the clients need not carry out DNS resolution of all the embedded URLs, resulting in reduced network message traffic and more rapid page display.

28 Claims, 6 Drawing Sheets

U.S. PATENT DOCUMENTS 6,366,947 B1 * 4/2002 Kavner ........................ 709/203
6,400,381 B1 * 6/2002 Barrett et al. ............... 345/758
6,412,008 B1 * 6/2002 Fields et al. ................. 709/228
6,665,838 B1 * 12/2003 Brown et al. ............. 715/501.1

* cited by examiner

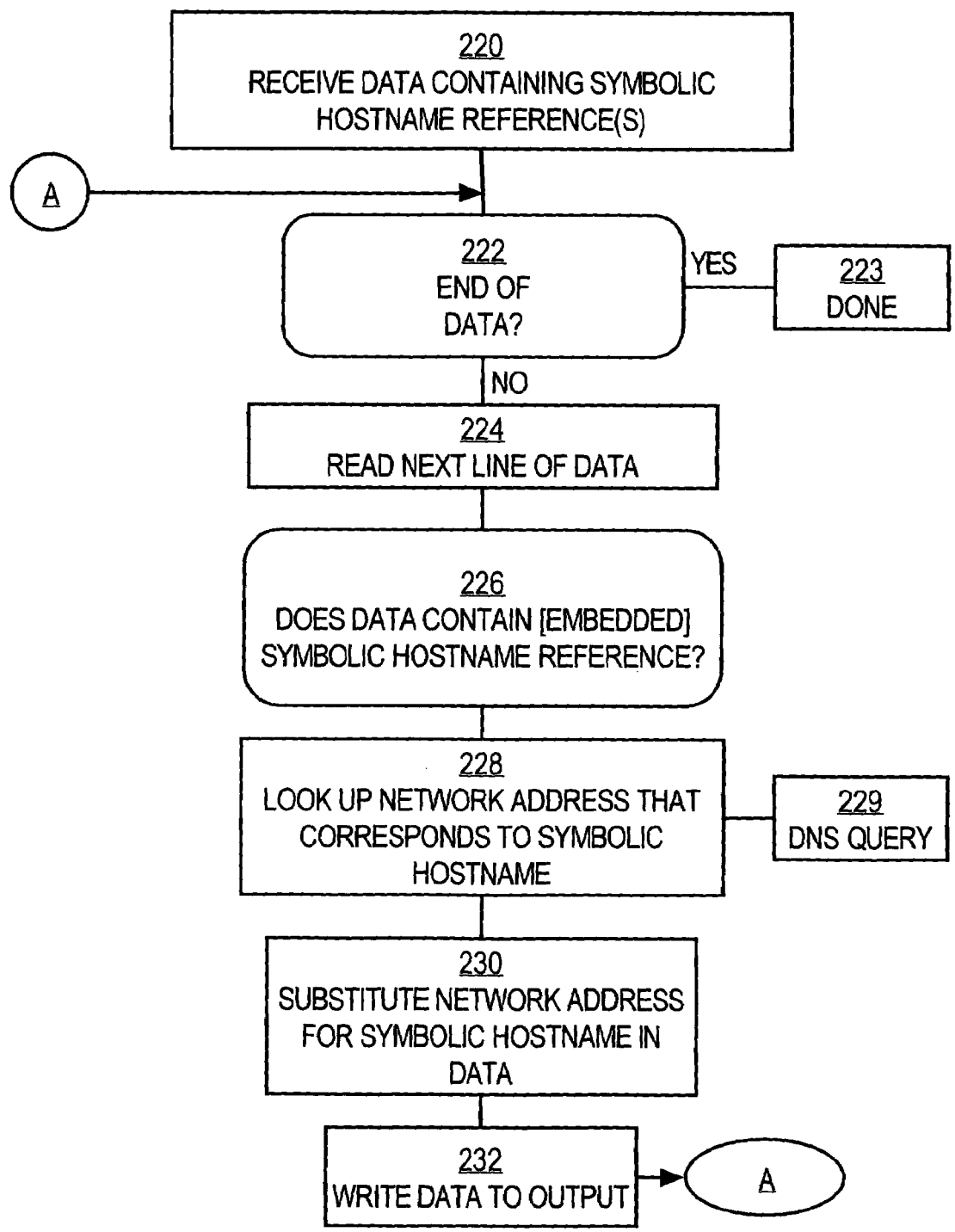

SYSTEM AND METHOD OF OPTIMIZING RETRIEVAL OF NETWORK RESOURCES BY IDENTIFYING AND SUBSTITUTING EMBEDDED SYMBOLIC HOST NAME REFERENCES WITH NETWORK ADDRESSES IN ACCORDANCE WITH SUBSTITUTION POLICIES

This application claims benefit of application Ser. No. 60/150/394 filed Aug. 23, 1999.

FIELD OF THE INVENTION

The present invention generally relates to data processing. The invention relates more specifically to methods and apparatus for optimizing retrieval of network resources.

BACKGROUND OF THE INVENTION

The set of global, packet-switched internetworks known as the Internet is in wide use. A significant proportion of the data traffic that flows through the Internet comprises requests and responses for documents or services based on protocols of the World Wide Web. Much of this traffic comprises HTML documents, or responses from services that respond to requests using HTML. A document is identified by sending a Universal Resource Locator (URL) that uniquely identifies the document from a browser to a server in the network. The hostname part of the URL is resolved, using the Domain Name Service (DNS), into an Internet Protocol (IP) address that identifies a computer that stores the document.

Due to the large volume of network traffic represented by such electronic documents and other network resources, several approaches have been attempted to improve performance by increasing the speed with which networked servers deliver resources to clients. In one approach, a proxy server is used to cache Web pages at a location that is geographically or logically near the requesting client, thereby decreasing server response time and reducing the need for expensive wide area network (WAN) resources.

In another approach, a router is configured as a load balancer to selectively route requests to one of a plurality of replicated servers that serve identical content. This results in faster response times because more server processing power is available to deliver a given set of content.

Still another approach involves placing a plurality of replicated servers in different geographic locations, often remotely located with respect to a master or originating content server. A local content server is either chosen by the end user, or provided automatically. One method that may be used for automatic selection of the closest replica is by providing, during DNS resolution, different IP network addresses in response to successive requests for the same host name. Each IP address identifies a replica located in a different geographic location.

The duration of a session carried out by a client varies greatly. Further, many client sessions involve requests for network resources that contain embedded symbolic references to other network resources. For example, a session may involve a client request for a Web page that has numerous embedded URLs that identify other Web pages or services. Embedded URLs are used to retrieve embedded objects within a Web page. An example of an embedded URL HTTP command: <img src "http://av.com/i/ytl.gif" width=6 height=20>. In this HTTP statement, an embedded URL follows the "img" tag. When a Web browser identifies an embedded URL in an HTML page, the browser automatically loads the HTML document, image or service that is identified by the embedded URL. The embedded URLs may comprise HTML image tags and associated URLs, applet tags that identify a codebase, object tags that identify a codebase, data, and class id, embed tags and URLs, etc.

Thus, an embedded URL forces the Web client to resolve the hostname in order to retrieve the embedded context, even if the user does not wish to continue browsing in the site. Embedded URLs with hostnames that are different from the hostname of the page that contains the embedded URLs are used primarily for commercial advertisements. In such sessions, a significant amount of the time incurred in delivering the Web page may involve resolving the IP addresses of the embedded URLs, using DNS. The time involved in carrying out such DNS resolution significantly increases overall session time, and introduces significant message traffic to the network.

Based on the foregoing, there is a need in this field for an improved method or apparatus for delivering or serving network resources.

There is a particular need for a way to improve the efficiency of Web page retrieval and display, by reducing the number of DNS resolution operations that are carried out.

Improving the efficiency of DNS resolution is also desirable for other reasons and in particular contexts. For example, the Microsoft Windows NT® operating system permits a system administrator to define IP addresses of multiple DNS servers as part of the IP stack configuration parameters. This feature is intended to permit definition of a primary DNS server address and one or more backup DNS server addresses that are used when the primary DNS server is unavailable. However, when multiple DNS servers are defined, the NT operating system will send DNS queries to all the DNS servers that are configured for the IP stack, without waiting for a reply or a timeout error from any of the DNS servers. In the typical case in which one main and one backup DNS server are configured, two DNS queries will be sent for every hostname resolution operation. Unfortunately, the hostname cache of each client stores only up to about ten (10) hostnames by default. This storage capacity is commonly overflowed in normal browsing sessions, resulting in resolution of the same hostnames over and over again.

Thus, there is a specific need for a system or method that can increase the speed with which network resources become available at a client, by improving the efficiency of resolution of hostnames.

SUMMARY OF THE INVENTION

The foregoing needs, and other needs that will become apparent from the following description, are addressed by the present invention, which comprises, in one embodiment, a method and apparatus for optimizing retrieval of network resources. In one embodiment, a method of optimizing access to a network resource is implemented in a computer program executed by a router, cache server, or proxy server. A network resource that contains one or more embedded symbolic host name references is received. A network address corresponding to each of the embedded symbolic host name references is determined. A modified copy of the network resource is created and stored; in the modified copy, a network address is substituted for each corresponding embedded symbolic host name reference. Thereafter, the modified copy of the network resource is used in responding to all subsequent client requests for the network resource, thereby greatly reducing the required number of network address lookup operations.

In one specific embodiment, IP addresses are determined using DNS queries for the hostname portion of all URLs that are embedded in a Web page using image, applet, object, or embed tags. The IP addresses are stored in place of the hostname portions in a modified copy of the Web page, typically in a cache. As a result, when the modified page is subsequently served to clients, the clients need not carry out DNS resolution of all the embedded URLs, resulting in reduced network message traffic and more rapid page display. The technique may be applied to all or some URLs of a Web page. In this way, DNS resolution is carried out once, when a page is initially accessed or retrieved, and not by all browsers each time that the page is requested.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2B is a flow diagram of a method of improving efficiency of retrieving network resources.

DETAILED DESCRIPTION OF THE PREFERRED EMBODIMENT

A method and apparatus for optimizing retrieval of network resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1A:
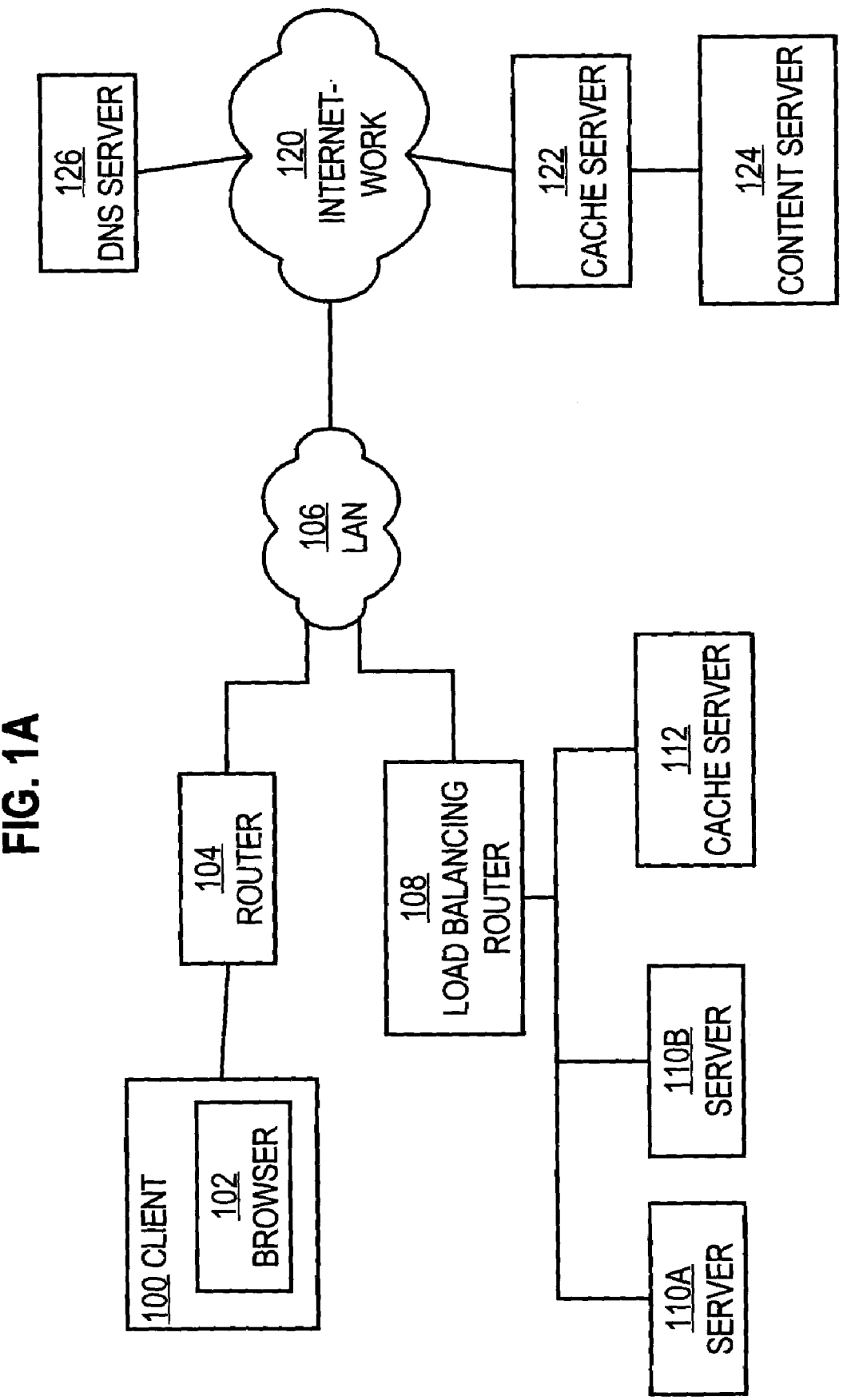
FIG. 1A is a block diagram of a network system in which an embodiment may be practiced.

FIG. 1A is a block diagram of a network system in which an embodiment may be practiced.

Client 100 executes a browser 102 and is coupled to router 104. Client 100 is any network end station device, such as a personal computer, workstation, personal digital assistant, cellular telephone, etc. Browser 102 comprises one or more software elements that can request, receive, interpret and display network resources, such as Web documents and data streams. Examples of browser 102 include Microsoft Internet Explorer®, Netscape Communicator®, a microbrowser, etc.

Router 104 couples client 100 to local area network 106, and comprises a computer-based data routing device of the type commercially available from Cisco Systems, Inc., San Jose, Calif. Network 106 comprises one or more end stations and network devices, such as routers and switches, which form a network local to an enterprise or campus. Additionally or alternatively, a load balancing router 108 couples local area network 106 to one or more servers 110A, 1110B, etc. One of the servers may locally cache network resources, as indicated by cache server 112.

Internetwork 120 comprises one or more network elements that couple local area network 106 to external resources, and may comprise a second local area network, a wide area network, the internetworks known as the Internet, etc. A cache server 122 and content server 124 may be coupled to internetwork 120 for delivering content across the internetwork and local area network 106 to client 100 or servers 110A, 110B, 112. In this context, "content" refers broadly to refer to any electronic document or data stream including, but not limited to HTML documents, a stream of HTML data representing output from a Web application, DTHML documents, XML documents or streams, etc.

At least one DNS server 126 is coupled to internetwork 120 and is accessible to client 100, router 104, servers 110A, 110B, 112, 122, 124 through the network. DNS server 126 is an element of the Domain Name Service of the Internet, and can receive requests to determine ("resolve") a symbolic or textual host name into an IP address of a computer associated with the host name. Numerous DNS servers may be distributed throughout the internetwork 120 and other elements of FIG. 1A. Each DNS server has a database that associates host names to IP addresses and other information, and periodically receives updates from a master DNS database located elsewhere in the network. Operation of the DNS system is described further in numerous publications, including, for example, D. Corner, "Computer Networks and Internets" (Prentice Hall, 1997), Chap. 24, "Naming With the Domain Name System."

The configuration of elements in FIG. 1A is provided as one example of a hypothetical network with which embodiments may be practiced. In a practical system, any number of clients, servers, routers, and other network elements may be interconnected in any conventional manner to form a network of any topology.

In this configuration, client 100 may request one or more resources that are served by content server 124 by sending an appropriate request through the network. In one embodiment, the request is an HTTP request that includes a URL of the requested resource. An application program of the client or an associated server creates and sends a DNS query to resolve the hostname portion of the URL into an IP address. The program or server then connects to the server and requests the resource. In some embodiments, if either cache server 112 or cache server 122 has the requested resource, one of them responds by delivering the resource.

Figure 1B:
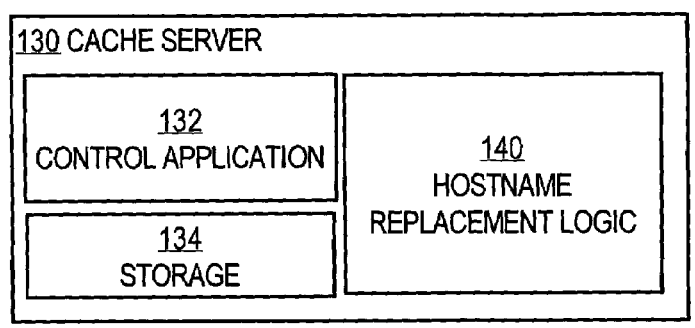
FIG. 1B is a block diagram of a cache server in which an embodiment may be practiced.

FIG. 1B is a block diagram of a cache server in which an embodiment may be practiced.

Cache server 130 comprises, in one example embodiment, a control application 132, storage 134, and hostname replacement logic 140. Control application 132 is one or more programs, scripts, or other software elements that implement cache service functions. For example, control application 132 may comprise an HTTP server, a cache traffic server, etc. Storage 134 is one or more mass storage devices and associated control electronics and software, such as disk drives and drivers. Hostname replacement logic 140 is one or more programs, scripts, or other software elements that cooperate with control application 132 and storage 134 to carry out the functions described in this document.

Thus, FIG. 1B illustrates that an embodiment of the processes described in this document may be implemented in software located at a cache server. Alternatively, an embodiment may be implemented in a router, in a load balancing router, or in a content server. In another alternative, software implementing the functions defined herein may be implemented in a router as part of Web Cache Control Protocol (WCCP), a protocol that is used by Cisco routers to forward Web traffic from a router to a local cache. In still other embodiments, program logic carrying out the functions described herein is implemented in a microbrowser or in a cellular telephone, personal digital assistant, set* top box, or other device. The functions described herein may be implemented in an application-specific integrated circuit (ASIC) or other hardware or electronics.

The particular mode of implementation of the functions is not critical, and an implementation may be located wherever electronic documents are processed for display, or wherever hostname resolution is normally carried out.

Functional Overview

Figure 2A:
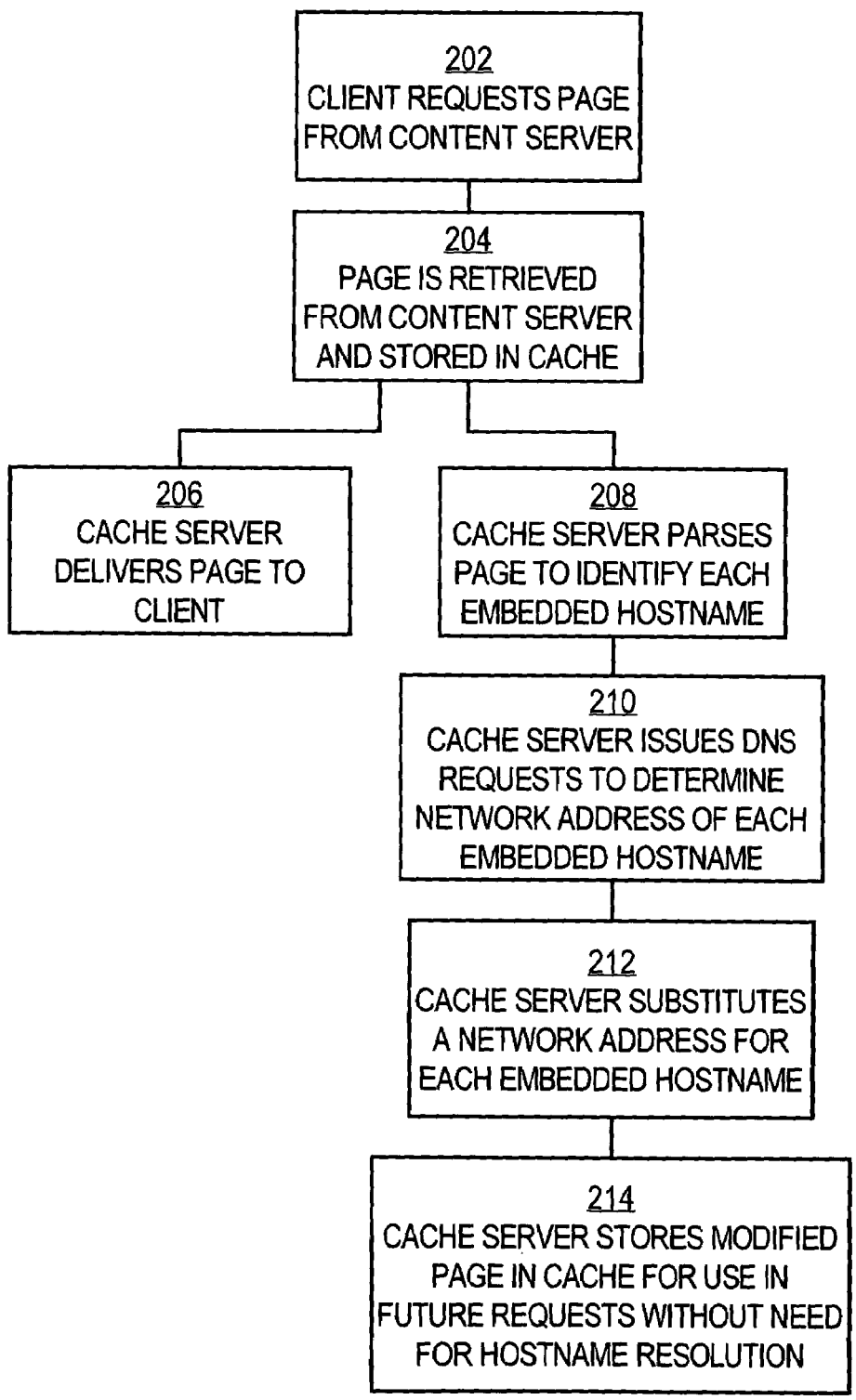
FIG. 2A is a flow diagram illustrating an exemplary method of retrieving a network resource.

FIG. 2A is a flow diagram illustrating an exemplary method of retrieving a network resource.

In block 202, a client requests a page from a content server. For example, client 100 sends an HTTP request for a particular Web page to content server 124. In this context, "page" is used broadly to refer to any electronic document or data stream. Examples include an HTML document, a stream of HTML data representing output from a Web application, DTHML documents, XML documents or streams, etc. In block 204, the requested page is retrieved from the content server and stored in a cache. For example, content server 124 passes the requested page to cache server 122, which stores the page in its cache.

In block 206, the cache server delivers the requested page to the client. Concurrently with block 206 or serially after block 206, in block 208, the cache server parses the page to identify one or more embedded hostnames. In one embodiment, block 208 involves parsing source code of the page to identify embedded URLs. The embedded URLs may comprise HTML image tags and associated URLs, applet tags that identify a codebase, object tags that identify a codebase, data, and class id, embed tags and URLs, etc. Additionally or alternatively, the cache server may parse the page to identify all URLs that are present in the page.

In block 210, the cache server issues a DNS request to determine the network address of each embedded hostname that was identified in block 208. Block 210 may involve issuing conventional DNS queries to the network in order to receive an IP address associated with each of the hostnames.

In block 212, the cache server substitutes a network address for each embedded hostname that was identified in block 208. Block 212 may involve creating and storing an HTML file comprising a copy of the page from the content server, in which one of the resolved IP addresses is written in the file in place of each hostname of an embedded URL.

In block 214, the cache server stores the modified page in the cache for use in response to future requests, without the need for hostname resolution. For example, the complete page is stored, e.g., in storage 134, after IP addresses are substituted for all hostnames of embedded URLs. Thereafter, when the cache server delivers the modified page to a client, the client does not need to resolve the IP address of the hostname of any embedded URL. Accordingly, page display time and the number of network messages are reduced.

FIG. 2B is a flow diagram of a method of improving efficiency of retrieving network resources. The flow diagram of FIG. 2B is a more general representation of selected steps of the process of FIG. 2A.

In block 220, data containing one or more symbolic hostname references is received. The data may comprise a stream, file, or other organization of one or more URLs or HTML tag sets that contain embedded URLs.

In block 222, an end of data test is carried out. If the end of the data has been reached, then processing concludes as shown by block 223. Alternatively, if unprocessed data remains, then the next line of data is read, as indicated by block 224.

In block 226, a test is carried out to determine whether the data contains one or more symbolic hostname references. As indicated by the bracketed word "[EMBEDDED]" in block 226, the hostname references may take the form of embedded references or embedded URLs. If one or more symbolic hostname references are found, then in block 228, the process determines a network address that corresponds to one of the symbolic hostnames. Block 228 may involve carrying out a DNS query based on the hostname and receiving an IP address in response, as indicated by block 229.

If a network address is successfully determined, then in block 230, the network address is substituted for the symbolic hostname in the data. Substitution may involve writing an IP address in place of a hostname. In block 232, the data is written to an output, e.g., stored or sent in a responsive message.

As indicated by circle A, the process iterates until all the data is processed.

To illustrate an example of the foregoing process, Table 1 shows an excerpt of HTML source code of an example home page recently generated by the "AltaVista" search engine service:

TABLE 1

EXAMPLE HTML SOURCE CODE WITH EMBEDDED SYMBOLIC HOSTNAME REFERENCES

```
<html>
<head>
<title>AltaVista - Search</title><base href="http://jump.altavista.com/"
target="_top"><meta http-equiv=Refresh content=300>
<link href="http://www.altavista.com/css/av.css" rel=stylesheet
type="text/css"><style type="text/css"><!-- a:{color:#000099}
a:vlink{color:#663366} a:hover{color:#007FFF} --></style></head>
<body bgcolor=White text=Black link="#000099" vlink="#663366"
alink="#FF0000">
<table width="100%" border=0 cellspacing=0 cellpadding=0>
<tr>
<td rowspan=3><a href="hfp_al"><img
src="http://www.altavista.com/i/logo_fp.gif" width=146 height=42
hspace=14 border=0 alt="altavista:"></a>      </td>
<td width="100%" height=5></td></tr>
<tr><th height=24 align=left class=nav nowrap>   
  <a href="http://jump.altavista.com/hfp_se" class=nav><font
color="#FFCC00">Search</font></a>    
  <a href="http://jump.altavista.com/hfp_li" class=nav>Live!</a>

<a href="http://jump.altavista.com/hfp_sh" class=nav>Shopping
</a>    
  <a href="http://jump.altavista.com/hfp_rb" class=nav>Raging
Bull</a>    
  <a href="http://jump.altavista.com/hfp_fa" class=nav>Free
Internet Access</a>    
  <a href="http://jump.altavista.com/hfp_em"
class=nav>Email</a></th></tr>
<tr><td height=15></td></tr></table>
<table width="100%" border=0 cellspacing=0 cellpadding=2><tr
align=center>
<td width="20%" height=65><a
href="http://ad.doubleclick.net/jump/homepgtable.av.com/sponsor-
button/toptext/left; sz=1x1; ad=1165636">
<img src="http://ad.doubleclick.net/ad/homepgtable.av.com/sponsor-
button/toptext/left; sz=1x1; ad=1165636" width=1 height=1 border=0>
```

TABLE 1-continued

EXAMPLE HTML SOURCE CODE WITH EMBEDDED
SYMBOLIC HOSTNAME REFERENCES

```
HugeSavings!<br>FurnitureFind.com</a></td>
<td width="40%"><A
HREF="http://ad.doubleclick.net/ad/jump/homepgtable.av.com/fullbanner;
sz=468x60; ord=155954144?"><IMG
SRC="http://ad.doubleclick.net/ad/homepgtable.av.com/fullbanner;
sz=468x60; ord=155954144?" border=0 height=60 width=468></A></td>
<td width="20%"><a
href="http://ad.doubleclick.net/jump/homepgtable.av.com/sponsor-
button/toptext/right; sz=1x1; ad=1034366">
<img src="http://ad.doubleclick.net/ad/homepgtable.av.com/sponsor-
button/toptext/right; sz=1x1; ad=1034366" width=1 height=1 border=0>
SendFlowers<br>Shop here now!</a></td></tr><tr><td colspan=4
height=11 width="100%"></td></tr></table>
```

The foregoing code contains fifteen (15) hostname references to hosts named "jump.altavista.com," "www.altavista.com," and "ad.doubleclick.net." For a browser to display a page containing the foregoing code, the browser needs to generate numerous DNS requests to resolve IP addresses of hosts having these hostnames. However, four (4) of the hostname references appear in embedded URLs carrying images; "www.altavista.com" appears once in an IMG tag and "ad.doubleclick.net" appears three (3) times in IMG tags. The user does not need to bookmark such URLs, and replacing the URLs with IP addresses would reduce DNS queries significantly.

As another example, in a recent session using the AltaVista service, selecting a URL associated with a hyperlink for "business and finance" led to the following additional DNS queries: "jump.altavista.com", "dir.altavista.com", "ads.adsmaximize.com", "ad.preference.com". Embedded URL hostname replacement would reduce DNS message traffic by an additional 75%. Replacement of the URL "jump.altavista.com" could save additional traffic, but is probably not worth the effort, as the user may want to bookmark it.

Table 2 presents the same source code as shown in Table 1, after substituting a server address for each embedded symbolic hostname reference according to the foregoing process:

TABLE 2

HTML SOURCE CODE AFTER SUBSTITUTION OF HOSTNAME
REFERENCES

```
<html>
<head>
<title>AltaVista - Search</title><base href="http://jumpaltavista.com/"
target="_top"><meta http-equiv=Refresh content=300>
<link href="http://www.altavista.com/css/av.css" rel=stylesheet
type="text/css"><style type="text/css"><! -- a:{color:#000099}
a:vlink{color:#663366} a:hover{color:#007FFF} --></style></head>
<body bgcolor=White text=Black link="#000099" vlink="#663366"
alink="#FF0000">
<table width="100%" border=0 cellspacing=0 cellpadding=0>
<tr>
<td rowspan=3><a href="hfp__al"><img src="http://123.3.4.5/i/
logo__fp.gif" width=146 height=42 hspace=14 border=0
alt="altavista:"></a>      </td>
<td width="100%" height=5></td></tr>
<tr><th height=24 align=left class=nav nowrap>   
  <a href="http://jump.altavista.com/hfp__se" class=nav><font
color="#FFCC00">Search</font></a>    
  <a href="http://jump.altavista.com/hfp__li" class=nav>Live!</a>

<a href="http://jump.altavista.com/hfp__sh" class=nav>Shopping
</a>    
```

TABLE 2-continued

HTML SOURCE CODE AFTER SUBSTITUTION OF HOSTNAME
REFERENCES

```
  <a href="http://jump.altavista.com/hfp__rb" class=nav>Raging
Bull</a>    
  <a href="http://jump.altavista.com/hfp__fa" class=nav>Free
Internet Access</a>    
  <a href="http://jump.altavista.com/hfp__em"
class=nav>Email</a></th></tr>
<table width="100%" border=0 cellspacing=0 cellpadding=2><tr
align=center>
<td width="20%" height=65><a
href="http://ad.doubleclick.net/jump/homepgtable.av.com/sponsor-
button/toptext/left; sz=1x1; ad=1165636">
<img src="http://100.1.2.3/ad/homepgtable.av.com/sponsor-
button/toptext/left; sz=1x1; ad=1165636" width=1 height=1 border=0>
HugeSavings!<br>FurnitureFind.com</a></td>
<td width="40%"><A
HREF="http://ad.doubleclick.net/jump/homepgtable.av.com/fullbanner;
sz=468x60; ord=155954144?"><IMG
SRC="http://100.1.2.3/ad/homepgtable.av.com/fullbanner; sz=468x60;
ord=155954144?" border=0 height=60 width=468></A></td>
<td width="20%"><a
href="http://ad.doubleclick.net/jump/homepgtable.av.com/sponsor-
button/toptext/right; sz=1x1; ad=1034366">
<img src="http://100.1.2.3/ad/homepgtable.av.com/sponsor-
button/toptext/right; sz=1x1; ad=1034366" width=1 height=1 border=0>
SendFlowers<br>Shop here now!</a></td></tr><tr><td colspan=4
height=11 width="100%"></td></tr></table>
```

In this example, hypothetical IP addresses are used for example purposes. In just this short segment of example code, four (4) substitutions could be made, thereby eliminating numerous DNS queries that a client otherwise would have to carry out to display the code segment in a browser window.

Figure 3:
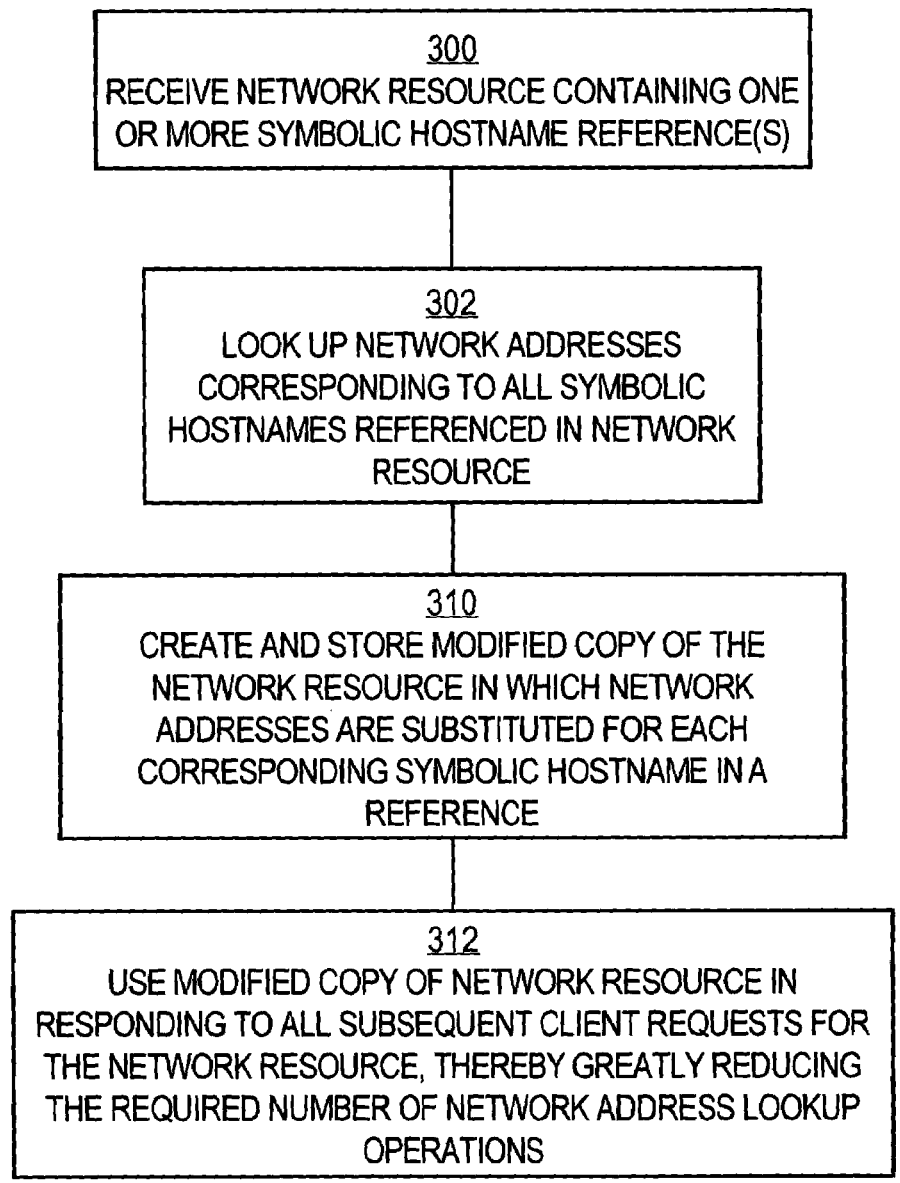
FIG. 3 is a flow diagram of an alternative method of improving efficiency of retrieving network resources.

FIG. 3 is a flow diagram of an alternative method of improving efficiency of retrieving network resources. The flow diagram of FIG. 3 is a more general representation of selected steps of the process of FIG. 2A and FIG. 2B.

In block 300, a network resource containing one or more symbolic hostname references is received. The network resource may comprise a Web page, HTML stream from a Web application, etc. In block 302, the process determines all network addresses corresponding to all symbolic hostnames that are referenced in the network resource. In block 310, a modified copy of the network resource is created and stored. In the modified copy, network addresses are substituted for each corresponding symbolic hostname in a reference. In block 312, the modified copy of the network resource is used in responding to all subsequent client requests for the network resource, thereby greatly reducing the required number of network address lookup operations involved in responding to such subsequent client requests.

In any of the foregoing embodiments, a system of process may replace the same URL with different IP addresses, to achieve load balancing of the Web traffic for multiple replicated servers. Further, a system or method in the foregoing embodiments may be deployed within a Web server, a proxy server, a load balancing router, or within any other network device. The system and process can resolve hostnames in real time when a Web page is being retrieved. The system and process may use look-ahead techniques to pre-resolve addresses for all Web pages that are referenced by URLs in a retrieved Web page. The system and process may cache Web pages and optimize the Web pages in a cache for later responses.

In one embodiment, the process is used to block browsing in unwanted Web sites that are referenced in a Web page. For example, a client may retrieve a Web page that contains unwanted, undesirable or objectionable embedded advertisements or messages. In this embodiment, each embedded URL that points to an objectionable or unwanted Web site is replaced, in a modified copy of the Web page, with a different URL. The different URL may reference, for example, a page of a predetermined server that contains a message explaining that a site referenced in the page is blocked.

Generally, replacement of hostnames to IP addresses should be done in a controlled manner. The primary application of the approaches described herein is expected to be replacement of embedded URLs as delineated by the HTML "img" (image) tag, "applet" tag, "object" tag, "embed" tag, etc. Although these approaches may also be used to replace all URLs that are specified in a Web page, including exposed URLs and those that are used in hyperlinks, this may reduce the utility of bookmarks that are created based upon the replaced URLs. Specifically, users who wish to bookmark Web pages for later usage typically want to create a bookmark using an intelligible URL that includes an understandable hostname, and not an IP address of the host. Further, if the owner or operator of a host changes the IP address associated with the host, then a bookmark that specifies a particular IP address may not work in the future. Similarly, if a hostname is associated, for load balancing purposes, with a plurality of servers each having different IP addresses, then a bookmark that specifies a particular IP address may not work if the servers are reassigned or moved to different IP addresses.

Moreover, there are tradeoffs between the processing work required to optimize a page in the foregoing manner, and the advantage it provides in terms of reducing DNS message traffic and an improved user experience. For example, applying the approaches described herein to URLs in search results that are generated by a search engine may not be efficient. Such pages generally are generated once and not re-used. Accordingly, the resources expended in carrying out DNS resolution for URLs in the search results may not achieve later efficiency. In particular, carrying out these approaches may involve DNS resolution of numerous URLs that appear in the search results but that are never used by a client.

Accordingly, selecting which Web pages and which hostnames to replace may be controlled by one or more policies. Policies may comprise one or more hostnames, or one or more URLs of Web pages that need replacement. An external policy server may be used to store and apply the policies. Policies may apply different replacement policies. Criteria for hostname replacement can be based on whether the hostname appears in an embedded URL or not.

In another embodiment, hostname replacement logic 140 or the functions defined herein includes a means enabling a user or administrator to define, or control, the tags and attributes that determine when hostnames are replaced. For example, hostname replacement logic 140 can include a configuration table, list, or other data structure that defines which text strings or other delineators in an electronic document are associated with an embedded hostname that should be replaced. In this way, hostname replacement logic 140 is made flexible and can operate on electronic documents that include new or future tags or other delineators that carry hostnames that need to be replaced. Further, a user may define custom tags that enable the hostname replacement logic 140 to operate in any kind of device.

Anchor Tag Replacement

HTML documents may include selectable hyperlinks that carry embedded URLs. In one embodiment, hostname replacement is carried out automatically on entire links, i.e., on anchor tags that encapsulate one or more embedded URLs. Material delineated by anchor tags is identified in HTML source code by the "/a" and "a" tags. For example, the source code excerpt shown in Table 1 includes the following text:

---

<a href="http://ad.doubleclick.net/jump/homepgtable.av.com/sponsor-button/toptext/left; sz=1x1; ad=1165636"><img src="http://ad.doubleclick.net/ad/homepgtable.av.com/sponsor-button/toptext/left; sz=1x1; ad=1165636" width=1 height=1 border=0> HugeSavings!<br>FurnitureFind.com</a></td>

---

In this example, a selectable hyperlink is defined by the material between the anchor tags. In the methods described above, only the hostname "ad.doubleclick.net" that falls within the "src" attribute of the "img" tag is replaced by an IP address, but not the hyperlink itself. This is acceptable, and saves DNS queries in those cases when a user does not select ("click on") advertisements themselves. However, additional efficiency is realized by changing the anchor tags relevant to the advertisements as well. This approach reduces the number of DNS queries required for those users who do click on links within advertisements. This has no effect on bookmarking links; the URLs of the advertisement cannot be bookmarked, because they are used only as jump links to the location of the actual web site that contains the advertising.

When the user does want to click on the advertisement, the hostname will be resolved. When an HTTP request is sent to the host "ad.doubleclick.net," that host will redirect the browser to the host "homepqtable.av.com," providing the reason "Moved Temporarily," and that site will be seen in the browser page.

This alternative method is optional and supplements the power of the method described above in which only embedded hostnames are replaced.

Hardware Overview

Figure 4:
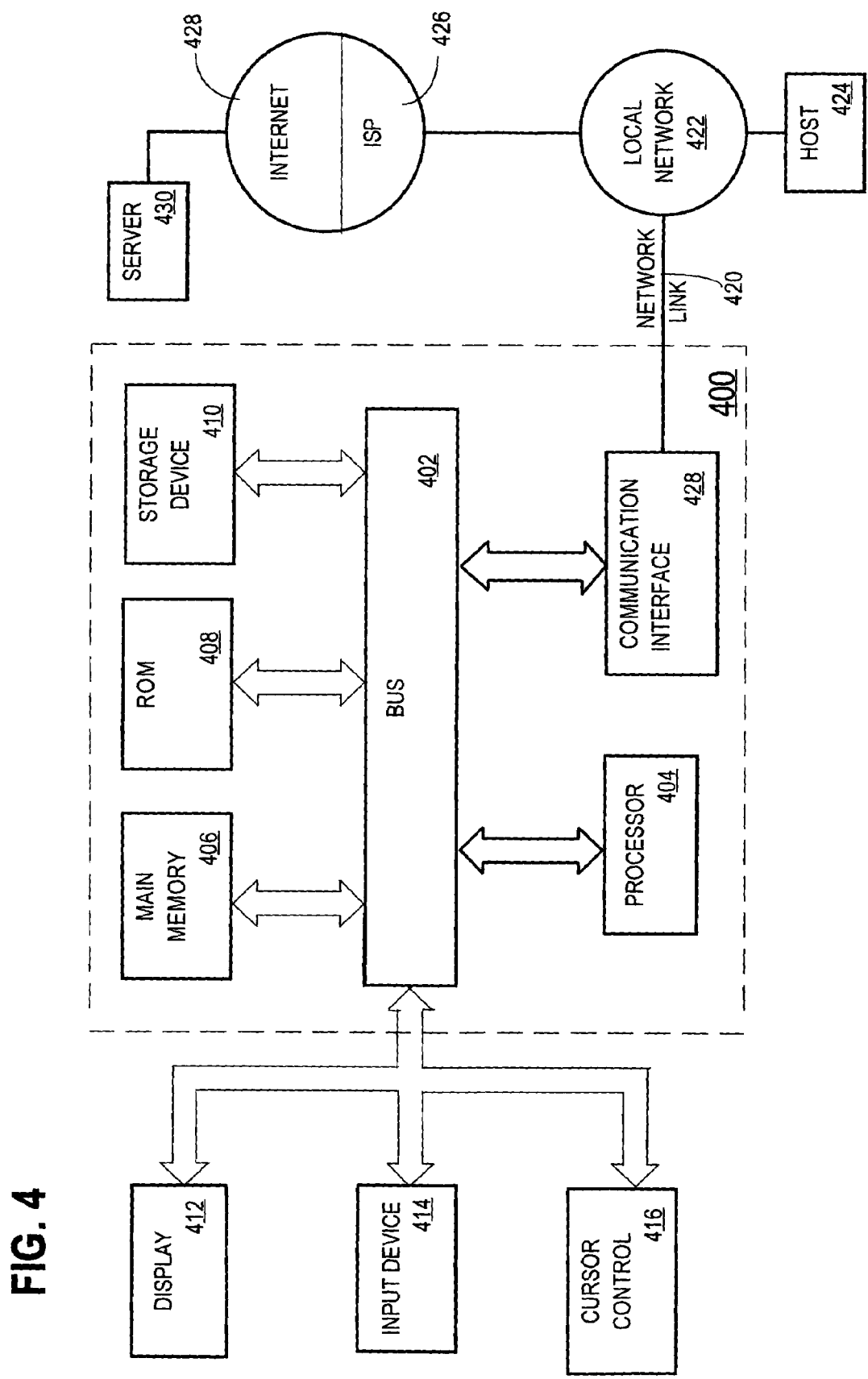
FIG. 4 is a block diagram of a computer system with which an embodiment may be implemented.

FIG. 4 is a block diagram that illustrates a computer system 400 upon which an embodiment of the invention may be implemented. Computer system 400 represents a possible implementation of cache server 112, cache server 122, etc. A router 104 that implements the invention would have different structure that is well known in this field.

Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for optimizing retrieval of network resources. According to one embodiment of the invention, optimized retrieval of network resources is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for optimizing retrieval of network resources as described herein.

Processor 404 may execute the received code as it is received, and/or stored in storage device 410, or other non-volatile storage for later execution. In this manner, computer system 400 may obtain application code in the form of a carrier wave.

Scope

A system and method that help increase overall Web performance have been described. The system and method may increase overall Web browsing performance, assist with load balancing, allow blocking of the browsing of unwanted Web sites, etc. The system may also enable a reduction in the number and cost of DNS servers in the network.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of optimizing retrieval of electronic documents, comprising the computer-implemented steps of:
   receiving and routing network packets;
   extracting a first electronic document from the network packets;
   identifying one or more symbolic references to other electronic documents within the first electronic document;
   determining a network address of each of the other electronic documents corresponding to each of the symbolic references;

creating and storing a modified copy of the first electronic document in which the network address is substituted for each corresponding symbolic reference in accordance with one or more substitution policies;

delivering the modified copy of the first electronic document in response to all subsequent client requests for the first electronic document, thereby greatly reducing the required number of network address lookup operations;

wherein the step of determining a network address of each of the other electronic documents corresponding to each of the symbolic references comprises load balancing by the steps of successively selecting a different one of a plurality of pre-determined network addresses of a plurality of servers for substitution for successive identical symbolic references.

2. A method as recited in claim 1, further comprising the steps of delivering an unmodified copy of the first electronic document in response to a client request for the first electronic document, concurrently while performing the steps of identifying, determining, creating and storing.

3. A method as recited in claim 1, further comprising the steps of:

determining that a plurality of the symbolic references identify one particular host name;

substituting a different network address in each of the symbolic references that identify the particular host name, wherein each different network address is associated with one of a plurality of replicated servers.

4. A method as recited in claim 1, further comprising the steps of creating and storing the modified copy in cache storage; delivering the modified copy from the cache in response to all subsequent client requests for the first electronic document.

5. A method as recited in claim 4, further comprising the steps of:

retrieving and storing in the cache storage, each of the other electronic documents;

carrying out the steps of identifying, determining, creating and storing, and delivering for each of the other electronic documents in the cache storage, before or at the same time as receiving one or more client requests for the other electronic documents.

6. A method as recited in claim 1, further comprising the steps of:

determining that one or more of the symbolic references identifies a prohibited network resource;

substituting a network address of a pre-determined network resource for the symbolic references to the prohibited network resource.

7. A method as recited in claim 6, wherein the pre-determined network resource is a pre-defined electronic document that comprises a message specifying that access to the prohibited network resource is prohibited.

8. A method as recited in claim 1, wherein the first electronic document comprises an HTML document, and wherein the symbolic references comprise only embedded URLs in the HTML document.

9. A method as recited in claim 1, wherein the first electronic document comprises an HTML document, and wherein the symbolic references comprise only selected URLs in the HTML document as determined according to a substitution policy.

10. A method as recited in claim 1, wherein the first electronic document comprises an HTML document, and wherein the symbolic references comprise all URLs in the HTML document.

11. A method of optimizing access to a network resource, comprising the computer-implemented steps of:

receiving a network resource that contains one or more embedded symbolic host name references;

determining a network address corresponding to each of the embedded symbolic host name references;

creating and storing on a cache server a modified copy of the network resource in which a network address is substituted for each corresponding embedded symbolic host name reference in accordance with one or more substitution policies;

using the modified copy of the network resource in responding to all subsequent client requests for the network resource, thereby greatly reducing the required number of network address lookup operations;

wherein the step of determining a network address corresponding to each of the embedded symbolic host name references comprises load balancing by the steps of successively selecting a different one of a plurality of pre-determined network addresses of a plurality of servers for substitution for successive identical embedded symbolic host name references.

12. A router that includes a stored program comprising one or more sequences of instructions for optimizing retrieval of network resources, wherein execution of the one or more sequences of instructions by one or more processors causes the one or more processors to perform the steps of:

receiving and routing network packets;

extracting data packets of a network resource that contains one or more embedded symbolic host name references;

determining a network address corresponding to each of the embedded symbolic host name references;

creating and storing on the router a modified copy of the network resource in which a network address is substituted for each corresponding embedded symbolic host name reference in accordance with one or more substitution policies;

using the modified copy of the network resource in delivering the network resource to a client, thereby greatly reducing the required number of network address lookup operations;

wherein the step of determining a network address corresponding to each of the embedded symbolic host name references comprises load balancing by the steps of successively selecting a different one of a plurality of pre-determined network addresses of a plurality of servers for substitution for successive identical embedded symbolic host name references.

13. A cache server that includes a computer-readable medium carrying one or more sequences of instructions for optimizing retrieval of network resources, wherein execution of the one or more sequences of instructions by one or more processors causes the one or more processors to perform the steps of:

receiving a network resource that contains one or more embedded symbolic host name references;

determining a network address corresponding to each of the embedded symbolic host name references;

creating and storing on the cache server a modified copy of the network resource in which a network address is substituted for each corresponding embedded symbolic host name reference in accordance with one or more substitution policies;

using the modified copy of the network resource in responding to all subsequent client requests for the network resource, thereby greatly reducing the required number of network address lookup operations;

wherein the step of determining a network address corresponding to each of the embedded symbolic host name references comprises load balancing by the steps of successively selecting a different one of a plurality of pre-determined network addresses of a plurality of servers for substitution for successive identical embedded symbolic host name references.

14. A proxy server that includes a computer-readable medium carrying one or more sequences of instructions for optimizing retrieval of network resources, wherein execution of the one or more sequences of instructions by one or more processors causes the one or more processors to perform the steps of:

receiving a network resource that contains one or more embedded symbolic host name references;

determining a network address corresponding to each of the embedded symbolic host name references;

creating and storing on the proxy server a modified copy of the network resource in which a network address is substituted for each corresponding embedded symbolic host name reference in accordance with one or more substitution policies;

using the modified copy of the network resource in responding to all subsequent client requests for the network resource, thereby greatly reducing the required number of network address lookup operations;

wherein the step of determining a network address corresponding to each of the embedded symbolic host name references comprises load balancing by the steps of successively selecting a different one of a plurality of pre-determined network addresses of a Plurality of servers for substitution for successive identical embedded symbolic host name references.

15. An apparatus for optimizing retrieval of electronic documents, comprising:

means for receiving and routing network packets;

means for extracting a first electronic document from the network packets;

means for identifying one or more symbolic references to other electronic documents within the first electronic document;

means for determining a network address of each of the other electronic documents corresponding to each of the symbolic references;

means for creating and storing on a cache server a modified copy of the first electronic document in which the network addresses are substituted for all corresponding symbolic references in accordance with one or more substitution policies;

means for delivering the modified copy of the first electronic document in response to all subsequent client requests for the first electronic document, thereby greatly reducing the required number of network address lookup operations;

wherein the step of determining a network address of each of the other electronic documents corresponding to each of the symbolic references comprises load balancing by the steps of successively selecting a different one of a plurality of pre-determined network addresses of a plurality of servers for substitution for successive identical symbolic references.

16. A computer-readable medium carrying one or more sequences of instructions for optimizing retrieval of network resources, wherein execution of the one or more sequences of instructions by one or more processors causes the one or more processors to perform the steps of:

receiving and routing network packets;

extracting a first electronic document from the network packets;

identifying one or more symbolic references to other electronic documents within the first electronic document;

determining a network address of each of the other electronic documents corresponding to each of the symbolic references;

creating and storing a modified copy of the first electronic document in which a network address is substituted for each corresponding symbolic reference in accordance with one or more substitution policies;

using the modified copy of the first electronic document in responding to all subsequent client requests for the first electronic document, thereby greatly reducing the required number of network address lookup operations;

wherein the step of determining a network address of each of the other electronic documents corresponding to each of the symbolic references comprises load balancing by the steps of successively selecting a different one of a plurality of pre-determined network addresses of a plurality of servers for substitution for successive identical symbolic references.

17. A computer-readable medium as recited in claim 16, further comprising the steps of delivering an unmodified copy of the first electronic document in response to a client request for the first electronic document, concurrently while performing the steps of identifying, determining, creating and storing.

18. A computer-readable medium as recited in claim 16, further comprising the steps of:

determining that a plurality of the symbolic references identify one particular host name;

substituting a different network address in each of the symbolic references that identify the particular host name, wherein each different network address is associated with one of a plurality of replicated servers.

19. A computer-readable medium as recited in claim 16, further comprising the steps of creating and storing the modified copy in cache storage of a cache server that executes the method; delivering the modified copy from the cache in response to all subsequent client requests for the first electronic document.

20. A computer-readable medium as recited in claim 19, further comprising the steps of:

retrieving and storing in the cache storage, each of the other electronic documents;

carrying out the steps of identifying, determining, creating and storing, and delivering for each of the other electronic documents in the cache storage, before or at the same time as receiving one or more client requests for the other electronic documents.

21. A computer-readable medium as recited in claim 16, further comprising the steps of:

determining that one or more of the symbolic references identifies a prohibited network resource;

substituting a network address of a pre-determined network resource for the symbolic references to the prohibited network resource.

22. A computer-readable medium as recited in claim 21, wherein the pre-determined network resource is a pre-determined electronic document that comprises a message specifying that access to the prohibited network resource is prohibited.

23. A computer-readable medium as recited in claim 16, wherein the first electronic document comprises an HTML document, and wherein the symbolic references comprise only embedded URLs in the HTML document.

24. A computer-readable medium as recited in claim 16, wherein the first electronic document comprises an HTML document, and wherein the symbolic references comprise only selected URLs in the HTML document as determined according to a substitution policy.

25. A computer-readable medium as recited in claim 16, wherein the first electronic document comprises an HTML document, and wherein the symbolic references comprise all URLs in the HTML document.

26. A method as recited in claim 1, wherein the electronic document comprises an HTML document, and wherein the symbolic references comprise hostnames in embedded URLs in the HTML document and hostnames in hyperlinks in the HTML document.

27. A method of optimizing retrieval of electronic documents, comprising the computer-implemented steps of:
 receiving and routing network packets;
 extracting a first electronic document from the network packets;
 identifying one or more symbolic host names contained only in one or more embedded Universal Resource Locators (URLs) within the first electronic document;
 determining a network address of each host corresponding to each of the symbolic host names;
 creating and storing on a cache server a modified copy of the first electronic document in which the network address is substituted for each of the symbolic host names in accordance with one or more substitution policies;
 delivering the modified copy of the electronic document in response to all subsequent client requests for the first electronic document, thereby greatly reducing the required number of network address lookup operations;
 wherein the step of determining a network address of each host corresponding to each of the symbolic host names comprises load balancing by the steps of successively selecting a different one of a plurality of pre-determined network addresses of a plurality of servers for substitution for successive identical symbolic host names.

28. A method as recited in claim 27, further comprising the steps of:
 identifying one or more second host names contained in one or more hyperlinks delineated by anchor tags within the first electronic document;
 determining a second network address of each second host corresponding to each of the second host names;
 storing the second network addresses in place of each of the second host names in the modified copy of the first electronic document.

* * * * *

UNITED STATES PATENT AND TRADEMARK OFFICE
CERTIFICATE OF CORRECTION

| | |
|---|---|
| PATENT NO. | : 7,082,476 B1 |
| APPLICATION NO. | : 09/578027 |
| DATED | : July 25, 2006 |
| INVENTOR(S) | : Ron Cohen et al. |

It is certified that error appears in the above-identified patent and that said Letters Patent is hereby corrected as shown below:

Title page, item (60) Related U.S. Application Data:

Delete --Provisional application No. 60/150,394, filed on August 23, 1999.--

In Column 15, line 33:

Delete "Plurality" and insert therefor --plurality--

Signed and Sealed this

Twenty-eighth Day of November, 2006

JON W. DUDAS
*Director of the United States Patent and Trademark Office*